(12) United States Patent
Freisthler et al.

(10) Patent No.: US 11,899,901 B2
(45) Date of Patent: Feb. 13, 2024

(54) COMPUTER-IMPLEMENTED NATURAL LANGUAGE PROCESSING FOR VIRTUAL ENVIRONMENT INTERACTIONS

(71) Applicant: TD Ameritrade IP Company, Inc., Omaha, NE (US)

(72) Inventors: Jeffrey Michael Freisthler, Ann Arbor, MI (US); Justin Wayne Webster, Omaha, NE (US); Christopher Nathan Melnick, Ellisville, MO (US); Bryan Edelman, St. Louis, MO (US); Nathan Ralph Hogge, Brighton, MI (US); Jacob Patrick Sullivan, Belleville, IL (US)

(73) Assignee: Charles Schwab & Co., Inc., San Francisco, CA (US)

( * ) Notice: Subject to any disclaimer, the term of this patent is extended or adjusted under 35 U.S.C. 154(b) by 78 days.

(21) Appl. No.: 17/378,938

(22) Filed: Jul. 19, 2021

(65) Prior Publication Data
US 2022/0147225 A1    May 12, 2022

Related U.S. Application Data

(60) Provisional application No. 63/110,832, filed on Nov. 6, 2020.

(51) Int. Cl.
G06F 3/048      (2013.01)
G06F 3/04815    (2022.01)
H04L 12/18      (2006.01)
H04L 51/046     (2022.01)

(52) U.S. Cl.
CPC ...... G06F 3/04815 (2013.01); H04L 12/1895 (2013.01); H04L 51/046 (2013.01)

(58) Field of Classification Search
None
See application file for complete search history.

(56) References Cited

U.S. PATENT DOCUMENTS

| | | | |
|---|---|---|---|
| 9,411,490 B2 | 8/2016 | Van Wie et al. | |
| 2011/0153768 A1* | 6/2011 | Carter | G06Q 10/10 709/207 |
| 2012/0179672 A1 | 7/2012 | Van Wie et al. | |

(Continued)

*Primary Examiner* — William C Trapanese
(74) *Attorney, Agent, or Firm* — Harness, Dickey & Pierce, P.L.C.

(57) ABSTRACT

A system facilitates real-time user interactions in a virtual environment of a user application accessible by multiple computing devices. System instructions include receiving a set of defined topics including a defined topic from a first computing device of the computing devices. The instructions include receiving, from at least one of the computing devices, data representing machine-readable text converted from a verbal conversation between two or more users in the virtual environment. The instructions include identifying a set of topics from the data representing machine-readable text. The instructions include comparing the identified set of topics from the data representing machine-readable text to the set of defined topics. The instructions include, in response to detecting a match between a topic of the identified set of topics and the defined topic of the set of defined topics, transmitting, to the first computing device, a notification of the matching defined topic.

20 Claims, 15 Drawing Sheets

(56) References Cited

U.S. PATENT DOCUMENTS

2012/0229446 A1* 9/2012 Hyndman ................ G09B 5/06
345/473
2014/0222831 A1* 8/2014 Ramkumar ............ G06F 16/95
707/748
2020/0401466 A1* 12/2020 Frost ................... G10L 15/1822

* cited by examiner

COMPUTER-IMPLEMENTED NATURAL LANGUAGE PROCESSING FOR VIRTUAL ENVIRONMENT INTERACTIONS

CROSS-REFERENCE TO RELATED APPLICATIONS

This application claims the benefit of U.S. Provisional Application No. 63/110,832 filed Nov. 6, 2020, the entire disclosure of which is incorporated by reference.

FIELD

The present disclosure relates to computerized systems and methods for facilitating user interactions in virtual environments, and more particularly to systems and methods of notifying users of topics of interest from conversations uttered over audio and/or video conferencing applications while interacting in virtual environments.

BACKGROUND

In recent years, remote activities have become increasingly important. For example, employers have allowed employees to work remotely, schools have allowed students to learn remotely, etc. In many cases, the remote activities are out of a necessity. As more activities are performed remotely and away from the physical office, classroom, etc., individuals become more isolated and lonely, and lose a sense of camaraderie with others.

In some cases, video conferencing applications such as Webex®, Skype®, etc. allow individuals to interact with each other. This may ease some of the isolation, loneliness, and decreasing camaraderie. In many cases, however, the use of video conferencing applications may not adequately replicate some sensations and experiences of physical office spaces, classrooms, etc. For example, in physical office spaces, sensations may include overhearing a conversation in a hallway, a meeting room etc. These types of activities, which are not experienced over video conferencing applications, typically trigger ad-hoc interaction between individuals and contribute to the propagation of organizational and professional knowledge in the physical office space.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system facilitates real-time user interactions in a virtual environment of a user application accessible by multiple computing devices. The system includes processor hardware and memory hardware configured to store instructions for execution by the processor hardware. The instructions include receiving a set of defined topics including a defined topic from a first computing device of the computing devices. The instructions include receiving, from at least one of the computing devices, data representing machine-readable text converted from a verbal conversation between two or more users in the virtual environment of the user application. The instructions include identifying a set of topics from the data representing machine-readable text. The instructions include comparing the identified set of topics from the data representing machine-readable text to the set of defined topics. The instructions include, in response to detecting a match between a topic of the identified set of topics and the defined topic of the set of defined topics, transmitting, to the first computing device, a notification of the matching defined topic.

In other features, the system includes a database. The instructions include storing the identified set of topics in the database. In other features, the system includes a database. The instructions include storing the set of defined topics in the database. In other features, the instructions include transmitting the virtual environment of the user application for display on the computing devices. In other features, the instructions include transmitting the identified set of topics for display in the virtual environment of the user application. In other features, the virtual environment includes a floor plan of a virtual office space. In other features, transmitting the notification of the matching topic includes transmitting the notification of the matching defined topic via a messaging application accessible by the first computing device.

In other features, the identified set of topics includes a first topic and a second topic. The instructions include determining a relevancy value of the first topic and a relevancy value of the second topic. In other features, the relevancy value of the first topic and the relevancy value of the second topic are determined based on at least one of user input and a data feed. In other features, the instructions include transmitting the first topic for display in the virtual environment as a first visual configuration based on the relevancy value of the first topic and transmitting the second topic for display in the virtual environment as a second visual configuration based on the relevancy value of the second topic. In other features, the instructions include determining whether the relevancy value of the first topic has degraded after a defined time period has elapsed. The instructions include, in response to determining the relevancy value of the first topic has degraded, transmitting the first topic for display in the virtual environment as a third visual configuration. The third visual configuration is different than the first visual configuration. In other features, transmitting the first topic for display in the virtual environment includes transmitting the first topic for display in the virtual environment only if the relevancy value of the first topic is greater than a threshold value. In other features, the first visual configuration is different than the second visual configuration when the relevancy value of the first topic is different than the relevancy value of the second topic.

A method of facilitating real-time user interactions in a virtual environment of a user application accessible by multiple computing devices includes receiving a set of defined topics including a defined topic from a first computing device of the computing devices. The method includes receiving, from at least one of the computing devices, data representing machine-readable text converted from a verbal conversation between two or more users in the virtual environment of the user application. The method includes identifying a set of topics from the data. The method includes comparing the identified set of topics from the data representing machine-readable text to the set of defined topics. The method includes, in response to detecting a match between a topic of the identified set of topics and the defined topic of the set of defined topics, transmitting, to the first computing device, a notification of the matching defined topic.

In other features, the method includes storing the identified set of topics in a database and storing the set of defined topics in the database. In other features, the method includes transmitting the virtual environment of the user application for display on the computing devices and transmitting the identified set of topics for display in the virtual environment of the user application. In other features, the virtual environment includes a floor plan of a virtual office space. In other features, transmitting the notification of the matching topic includes transmitting the notification of the matching defined topic via a messaging application accessible by the first computing device.

In other features, the identified set of topics includes a first topic and a second topic. The method includes determining a relevancy value of the first topic and a relevancy value of the second topic based on at least one of user input and a data feed, transmitting the first topic for display in the virtual environment as a first visual configuration based on the relevancy value of the first topic, and transmitting the second topic for display in the virtual environment as a second visual configuration based on the relevancy value of the second topic. In other features, the method includes determining whether the relevancy value of the first topic has degraded after a defined time period has elapsed and, in response to determining the relevancy value of the first topic has degraded, transmitting the first topic for display in the virtual environment as a third visual configuration. The third visual configuration is different than the first visual configuration. Transmitting the first topic for display in the virtual environment includes transmitting the first topic for display in the virtual environment only if the relevancy value of the first topic is greater than a threshold value. The first visual configuration is different than the second visual configuration when the relevancy value of the first topic is different than the relevancy value of the second topic.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

The present disclosure describes systems and methods for facilitating real-time user interactions in virtual environments. Remote activities (such as working and learning) have become increasingly important to companies, schools, etc. as individuals are spending more time away from dedicated physical spaces (offices, classrooms, etc.). For example, when employees of a company are working remotely, there may be many experiences and/or sensations of an office environment that are missed. These experiences and/or sensations may include, for example, overhearing conversations in hallways, overhearing muffled topics of interest and/or relevant topics being uttered from offices, participating in watercooler conversations, etc.

This disclosure may help employees find ways to virtually replicate office, classroom, etc. activities by generating a virtual environment employable with an underlying communications application such as a conferencing application (e.g., a video conferencing application, an audio conferencing application, etc.), and transmitting the virtual environment for rendering on computing devices. This may allow remote individuals to be notified of various conversations taking place in the virtual environment (via the conferencing application) and of possible topics of interest and/or relevant topics in the conversations.

As a result, individuals may be encouraged to interact in ad-hoc (also called spontaneous) and/or scheduled conversations, collaborations, etc. in the virtual environment. As such, remote experiences may be improved by providing a proximity to others, a feeling of a presence as they work, etc. that are commonly experienced in non-remote work experiences. In various implementations, the conferencing application may be limited to audio and/or text to reduce potential fatigue from videoconferencing.

Block Diagrams

Figure 1:
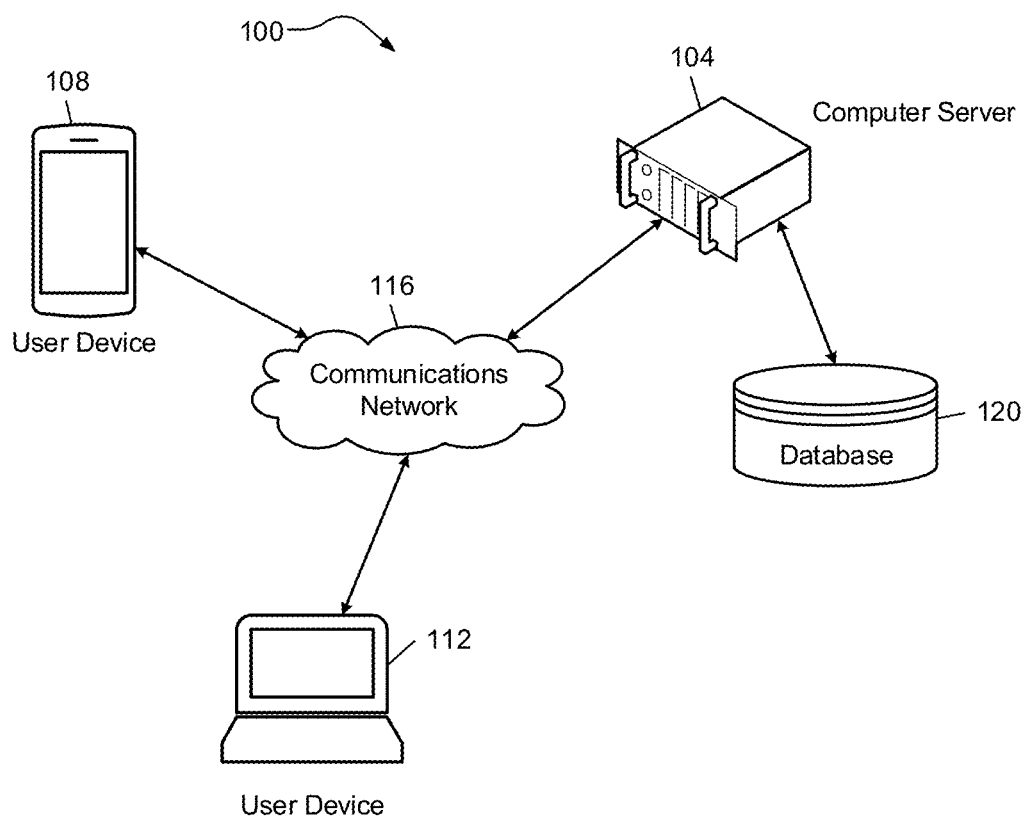
FIG. 1 is a functional block diagram of a simplified example implementation of a system for facilitating real-time user interactions in a virtual environment according to the principles of the present disclosure.

In FIG. 1, a system 100 for facilitating real-time user interactions in a virtual environment is depicted. As shown, the system 100 includes a computer server 104 in communication with computing devices 108, 112 (also referred to as user devices) via a communications network 116. The system 100 may optionally include a database 120 in communication with the computer server 104. Although not shown in FIG. 1, the computer server 104 includes one or more processors and memory coupled to the one or more processors. The memory may store instructions for execution by the one or more processors.

The computer server 104 may encompass and/or be in communication with various servers. For example, the servers may include a communications server for hosting/supporting a conferencing application (with voice and/or video), a web server for hosting/supporting a web browser and/or a user software application, a messaging server for hosting/supporting a messaging application, etc. In such examples, the conferencing application, the web browser, the user software application, the messaging application, etc. may be stored on and/or accessible by the computing devices 108, 112.

The instructions may enable the computer server 104, another server in communication with the computer server 104, etc. to perform various functions when executed by the one or more processors. For example, the computer server 104 and/or another server may generate a virtual environment employable with the underlying conferencing application (e.g., Webex®, Skype®, etc.), and transmit the virtual environment for display on the computing devices 108, 112.

The computing devices 108, 112 may access the virtual environment. For example, the computing devices 108, 112 may include a web browser that interacts with the computer server 104 via standard HTTP protocols for accessing the virtual environment. In other examples, one or both computing devices 108, 112 may access the virtual environment from the computer server 104 via a user application. In some examples, the web browser and the user application may be directly supported by the computer server 104, or supported by a web server in communication with the computer server 104. Regardless, the web browser and the user application may render the virtual environment such as a floorplan representing of a virtual space (e.g., an office) for display on the computing devices 108, 112.

The virtual environment may include any suitable visualization of a grouping of avatars representing users on the conferencing application. For example, avatars (e.g., profile pictures, symbols, initials, etc.) representing users may be displayed on the floorplan or another suitable virtual environment. The avatars may move about the virtual space and communicate with others using the conferencing application. As such, users may navigate through a virtual floor plan or another suitable virtual environment, and have conversations with others in a similar manner as an actual space (e.g., office space). This allows the users to have ad-hoc conversations, scheduled meetings, etc. via the virtual environment and the conferencing application.

In other embodiments, the computer server 104 and/or another server may receive a set of defined topics and data representing a verbal conversation between two or more users in the virtual environment. In such examples, the data may include, for example, data representing machine-readable text converted from the verbal conversation, data from a raw audio file (e.g., a .wav file) of the verbal conversation, etc. The defined topics may be provided by users of the computing devices 108, 112, and the data representing the verbal conversation may be provided by either (or both) of the computing devices 108, 112. After the data is received, the computer server 104 may identify a set of topics from the machine-readable text, the audio file, etc., and compare the identified set of topics to the set of defined topics. In response to detecting a match between any of the identified set of topics and the set of defined topics, the computer server 104 may transmit a notification of the matched topic to one or more computing devices (e.g., any one of the computing devices 108, 112, another computing device in communication with the computer server 104, etc.).

For example, and as further explained below, a user of the computing device 108 may provide one or more defined topics of interest to the computer server 104. In other words, the user may specify and provide his/her preference in topics to the computer server 104. Later, users of the computing device 112 and another computing device may be having a verbal conversation using the conferencing application. The computer server 104 may receive data representing the verbal conversation, and identify topics from the data. If one of the defined topics that interests the user of the computing device 108 is one of the identified topics, the computer server 104 may transmit a notification of the matched topic to the computing device 108 to inform the user of the conversation. The notification may be transmitted via a messaging application such as Slack®, Teams®, email, text message, etc. This may encourage the user of the computing device 108 to join the conversation relating to one of his/her preferred topics.

Additionally, and further explained below, the computer server 104 and/or another server may transmit the identified topics for display in the virtual environment. In some examples, the computer server 104 may determine a relevancy value of each identified topic, and transmit only the identified topics having a relevancy value greater than a threshold value. In other examples, the computer server 104 may transmit the identified topics for display in the virtual environment based on their relevancy values, which may change over time. In such examples, one identified topic having a particular relevancy value may be displayed with a different configuration (e.g., different visual indicators such as font, style, size, color, flashing, etc.) than another identified topic having a different relevancy value.

In some embodiments, a voice recognition functionality may be employed to determine the actual content of the verbal conversation between users. For example, application programming interfaces (APIs) such as voice recognition APIs of the web browsers, the user applications, etc. may provide always-on voice and video capabilities, as well as to allow screen sharing.

Additionally, in some examples, the APIs are exposed for access by other devices. As such, devices such as Internet of Things (IoT) devices (e.g., smart speakers, motion detectors, lights, etc.) may be integrated into the system and access data (e.g., data representing machine-readable text converted from the verbal conversations, data from an audio file of the verbal conversations. etc.) in the system. In some examples, this data may be used to control the IoT devices. For example, if a certain condition is met (e.g., a topic of interest of a user is identified during a conversation via the conferencing application), a physical light in a room at the user's residence may flash, turn on, dim, brighten, change colors, etc.

The voice recognition functionality may also be used to provide visual indicators of an active discussion between users in a particular area (e.g., a room) of the virtual environment. For example, the computer server 104 may receive a communication indicating a verbal conversation between users in a particular area. In response, the computer server 104 may cause the avatars representing the users to flash, change colors, etc. This may provide a notification to others interacting with the virtual environment that an active discussion is taking place. As such, one or more other users may feel compelled to join the discussion if desired.

Figure 2:
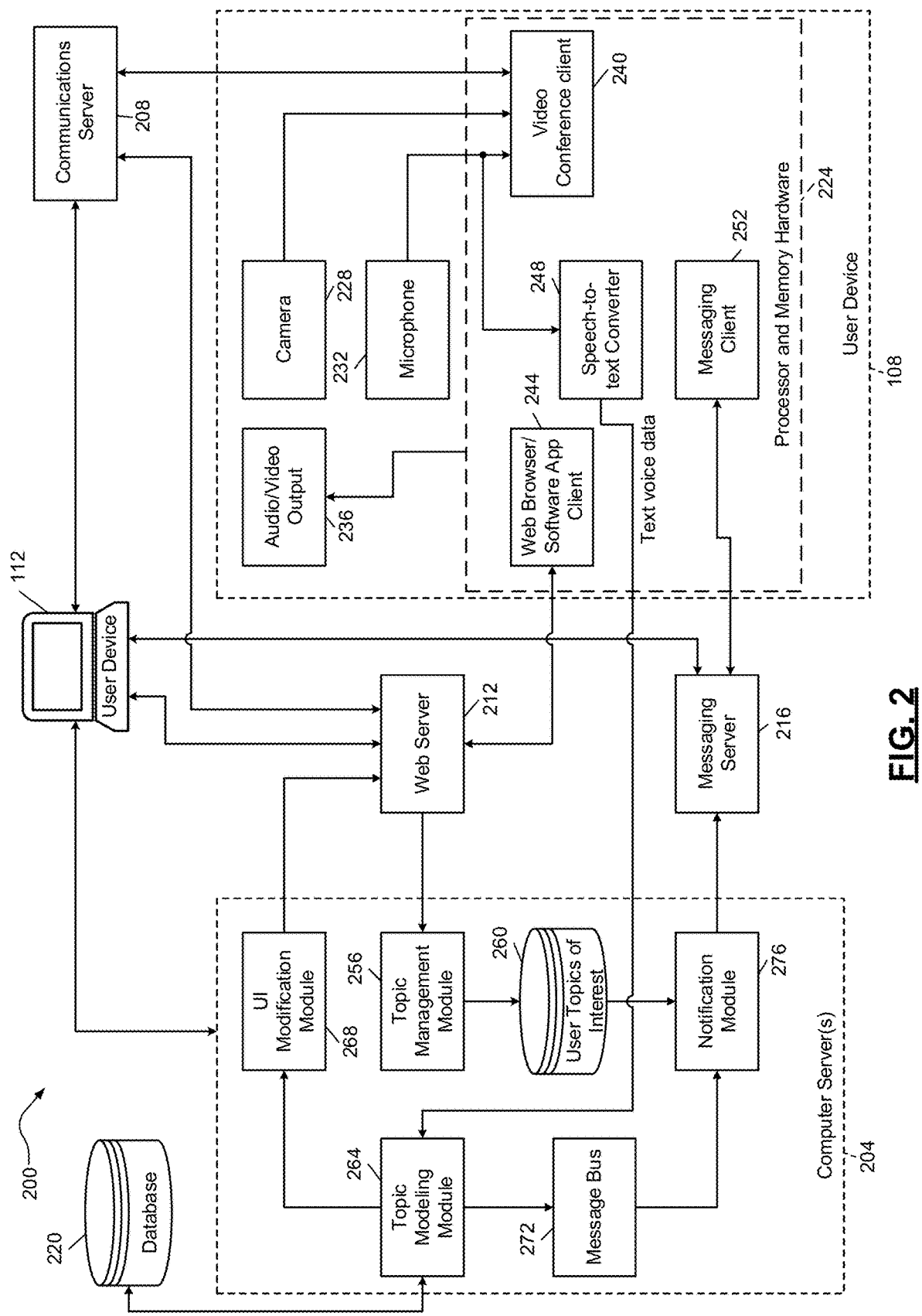
FIG. 2 is a functional block diagram of an example implementation of a system for notifying users of topics of interest from conversations uttered over a video conferencing application while interacting in a virtual environment, according to the principles of the present disclosure.

In FIG. 2, a system 200 for notifying users of topics from conversations uttered over a video conferencing application while interacting in a virtual environment, and facilitating real-time user interactions is depicted. Although the system 200 of FIG. 2 is described with reference to an underlying video conferencing application, it should be appreciated that the system 200 of FIG. 2 and/or any other system disclosed herein may be implemented (at least in part) with another suitable underlying conferencing application. For example, the system 200 of FIG. 2 and/or any other system disclosed herein may be implemented with an audio conferencing application with or without screen sharing capabilities.

As shown, the system 200 includes at least one computer server 204, the computing devices 108, 112 of FIG. 1, a communications server 208, a web server 212, a messaging server 216, and a database 220. The computer server 204 is in communication with the web server 212, the messaging server 216, and the database 220 via one or more communications networks, and the computing devices 108, 112 are in communication with the servers 204, 208, 212, 216 via the same or different communications network(s).

As shown in FIG. 2, the computing device 108 includes processor and memory hardware 224, one or more input devices such as a camera 228 and a microphone 232, and one or more output devices 236 such as a speaker, a display, etc. The computing device 108 may include additional and/or alternative user input and/or output devices if desired.

The processor and memory hardware 224 includes a video conference client 240 in communication with the communications server 208 for executing a video conferencing application (e.g., Webex®, Skype®, etc.) on the computing device 108, a client 244 (e.g., a web browser client, a software application client, etc.) in communication with the web server 212, a speech-to-text converter 248 for converting a verbal conversation to text, and a messaging client 252 in communication with the messaging server 216 for executing a messaging application (e.g., Slack®, Teams®, etc.). The processor and memory hardware 224 may also include an operating system and/or various drivers, none of which are shown in FIG. 2.

Additionally, although the clients 240, 244, 252 and the converter 248 are shown as separate components in FIG. 2, some or all of these components may be part of a unified client if desired. Further, the computing device 108 may employ one application for messaging and video conferencing. In such examples, the video conference client 240 and the messaging client 252 may be one client for messaging and video conferencing. In such examples, the communications server 208 and the messaging server 216 may be combined.

The computing device 112 may include similar or different components as the computing device 108.

As shown in FIG. 2, the computer server 204 includes a topic management module 256, a database 260, a topic modeling module 264, a user interface (UI) modification module 268, a message bus 272, and a notification module 276. The topic management module 256 and the UI modification module 268 are in communication with the web server 212, the topic modeling module 264 is in communication with the speech-to-text converter 248 of the computing device 108, and the notification module 276 is in communication with the messaging server 216.

The system 200 may encourage real-time user interactions in a virtual environment. For example, each computing device 108, 112 may be running a video conferencing application (via the video conference client 240) and a user application (via the client 244) that is compatible with the video conferencing application. The user application may include a virtual environment displayed on one of the output devices 236, as explained above. Users of the computing devices 108, 112 may be visually represented as avatars in the virtual environment, and communicate with each other through the video conferencing application.

For example, the user of the computing device 108 (and/or the computing device 112) may have a conversation with another user in a room, an area, etc. of the virtual environment over the video conferencing application (via the client 240). During this conversation, a voice recognition functionality of the computing device 108 may detect verbiage from the conversation, and the speech-to-text converter 248 may convert the verbiage into machine-readable text. In such examples, only users virtually present in the room, the area, etc. of the virtual environment may hear the conversation. In other words, users not virtually in the area, etc. where the conversation is taking place in the virtual environment are unable to hear the conversation.

The computing device 108 and/or the computing device 112 then transmit data representing the machine-readable text to the topic modeling module 264 of the computer server 204. In other examples, the computing device 108 and/or the computing device 112 may transmit data from a raw audio file (e.g., a .wav file) of the verbal conversation, as explained herein.

After the computer server 204 receives the data representing the conversation, the topic modeling module 264 may identify a set of topics from the conversion. The topic modeling module 264 may employ any suitable topic modeling technique such as a natural language processing technique, a deep learning technique, etc. to identify the topics. In some examples, the topic modeling module 264 may also determine relevancy values of the identified topics, as further explained below. The identified topics and their relevancy values may be passed to the database 220 for storage if desired.

The topic modeling module 264 then transmits the identified topics and/or their relevancy values to other modules in the computer server 204. For example, and as shown in FIG. 2, the topic modeling module 264 transmits the identified topics and their relevancy values to the UI modification module 268. In response to receiving the identified topics, the UI modification module 268 may transmit the identified topics for display in the virtual environment on the computing devices 108, 112 via the web server 212. In some examples, the UI modification module 268 may generate different visual UI configurations based on relevancy values of the identified topics. In such examples, topics having different relevancy values may be shown with different visual indicators such as font, style, size, color, flashing, etc. Additionally, the relevancy value of one of the identified topics may change over time. In such cases, the visual UI configuration of that topic may change as well.

Figure 3:
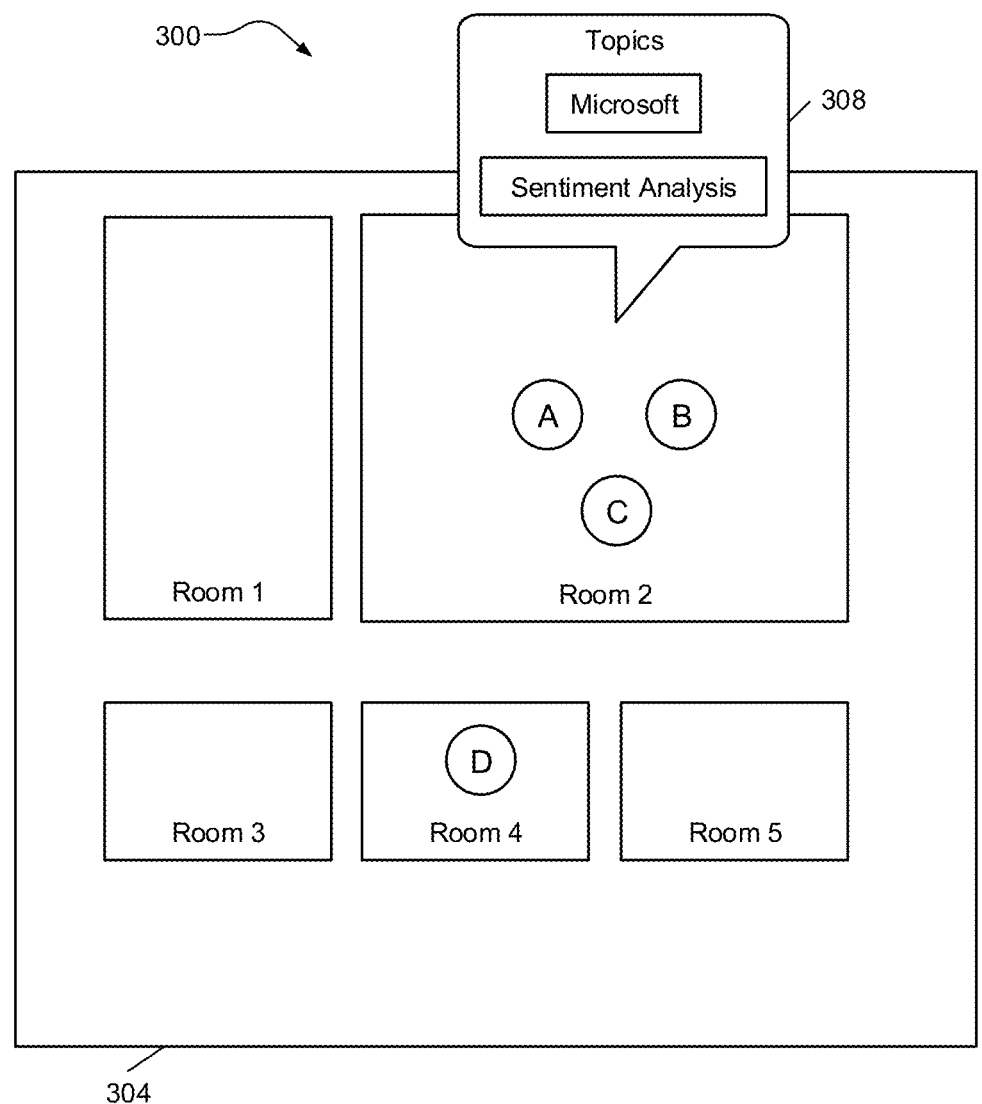
FIG. 3 is a functional block diagram of an example implementation of a virtual environment displaying a notification according to the principles of the present disclosure.

For example, FIG. 3 depicts one example of a screenshot 300 of a virtual environment displayed on the computing devices (e.g., the computing devices 108, 112) in communication with the server 204. The virtual environment represents an office floor plan 304. As shown, the floor plan 304 includes rooms 1-5, and four avatars A, B, C, D representing users of computing devices. The avatars A, B, C are located (virtually) in room 2, and the users represented by the avatars A, B, C are having a conversation via the video conferencing application. The avatar D is located (virtually) in room 4, and the user represented by the avatar D cannot hear the conversion taking place between the users represented by the avatars A, B, C. In the example of FIG. 3, the user represented by the avatar A may be using the computing device 108, the user represented by the avatar D may be using the computing device 112, and the users represented by the avatars B, C may be using other computing devices. During the conversation, any of the voice recognition applications of the computing devices corresponding to the avatars A, B, C may detect verbiage from the conversation, and convert that verbiage into the following text: "I really enjoyed the Microsoft Keynote event yesterday. There was a great presentation on improvements around sentiment analysis." This phrase (or data representing this phrase) may be transmitted to the topic modeling module 264, where it may identify "Microsoft" and "Sentiment Analysis" as topics from the text.

After the topics are identified, the UI modification module 268 may transmit the identified topics for display in the virtual environment (e.g., the office floor plan 304). For example, in FIG. 3, the identified topics are shown in a bubble 308 adjacent room 2. This provides a notification to other users participating in the virtual environment (such as the user represented by the avatar D in room 4) about the topics being discussed in room 2. This may encourage other users in the virtual environment to enter (virtually) into room 2 and join the conversation. Additionally, in some examples, the topics "Microsoft" and "Sentiment Analysis" in the bubble 308 may have different visual configurations (e.g., different fonts, sizes, colors, order, etc.) if their relevancy values are different.

Referring back to FIG. 2, the topic modeling module 264 may also transmit the identified topics to the notification module 276 via the message bus 272. The notification module 276 may determine if any of the identified topics is particularly relevant to users using and/or having access to the virtual environment. For example, the notification module 276 may detect any matches between the identified topics and defined topics provided by the users of the computing devices 108, 112 (and/or other defined topics provided by users of other computing devices). In response to detecting one or more matches, the notification module 276 transmits a notification of the matching topic(s) to the messaging server 216. The notification may then be passed to each appropriate computing device via its messaging client (e.g., the messaging client 252 of the computing device 108) to notify the user of the identified topic. The notification may include, for example, the interested topics, names of the users participating in the conversation, a location of the conversation within the virtual environment, a timestamp of the conversation, and/or a clickable link to the location within the virtual environment. This may encourage users to join the conversation.

Figure 4:
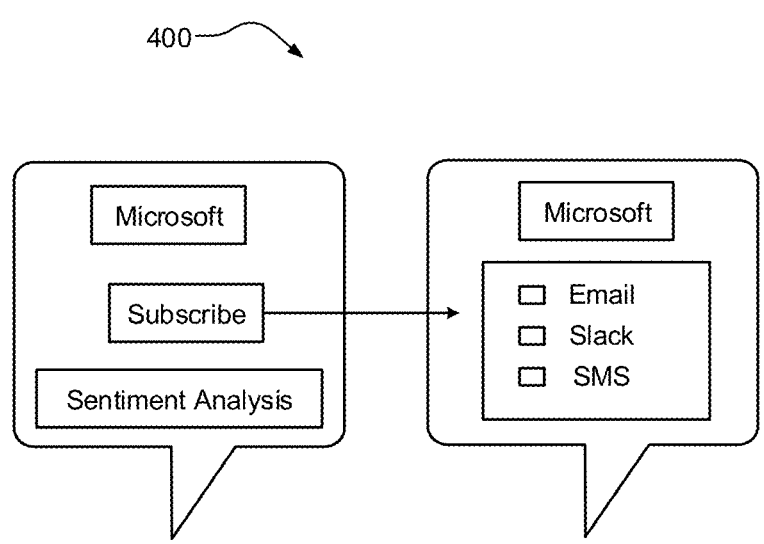
FIG. 4 is a functional block diagram of an example implementation of a user interface for subscribing to topics of interest according to the principles of the present disclosure.

For example, the users of the computing devices 108, 112 may subscribe to particular topics of interest and/or unsubscribe to other topics, and provide these defined topics to the computer server 204 via the web server 212. Specifically, the defined topics are provided to the topic management module 256 of the computer server 204 and stored in the database 260 for use by the notification module 276. FIG. 4 depicts one example of a screenshot 400 of a user interface on a computing device (e.g., the computing device 108). When using the user interface, a user may select topics such as "Microsoft" and "Sentiment Analysis", and then select how the user will be notified (e.g., via email, Slack, SMS text message, etc.). As such, if the topic modeling module 264 of FIG. 2 identified "Microsoft" and "Sentiment Analysis" as topics, the notification module 276 may provide a notification to the computing device as explained above.

Figure 5:
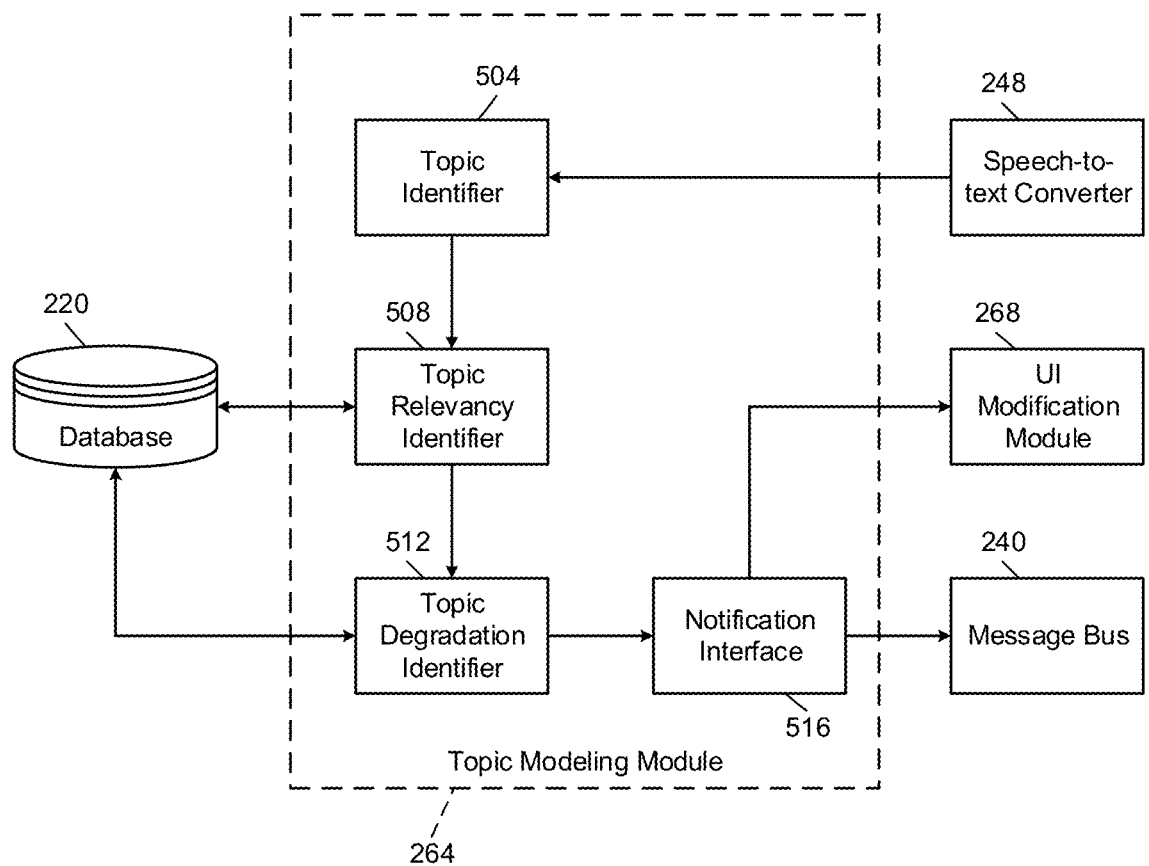
FIG. 5 is a functional block diagram of an example implementation of a topic modeling module in the system of FIG. 2.

FIG. 5 depicts one example of the topic modeling module 264 of FIG. 2 that identifies topics from text and determines relevancy values of the identified topics. As shown in FIG. 5, the topic modeling module 264 includes a topic identifier 504, a topic relevancy identifier 508, a topic degradation identifier 512, and a notification interface 516. The topic identifier 504 receives data representing the machine-readable text from the converter 248 of FIG. 2, identifies topics from the text, and transmits the identified topics to the topic relevancy identifier 508.

The topic relevancy identifier 508 determines relevancy values of identified topics. In some examples, each relevancy value may be a weighted average that accounts for a degree of importance for that corresponding topic as compared to other identified topics of the set. The topic relevancy identifier 508 may determine relevancy values based on various factors including user input, data feeds, etc. For example, the topic relevancy identifier 508 may receive user input (directly, via a database, etc.) from users using and/or having access to the virtual environment, one or more data feeds providing information from news articles, blogs, internet traffic, etc., and/or data relating to other detected conversations from the in the virtual environment. The identified topics and their relevancy values may be stored in the database 220 if desired.

The topic relevancy identifier 508 may transmit the identified topics and their relevancy values to the topic degradation identifier 512. In response, the topic degradation identifier 512 determines whether the relevancy values of the identified topics have degraded. For example, the relevancy of topics may naturally degrade over time. In some examples, a topic discussed mere hours ago may become less relevant as compared to a more recent topic of interest identified by a user. The topic degradation identifier 512 may determine the decrease of relevancy of the topics and adjust their relevancy values based on, for example, a stored formula. In some examples, the identified topics and their updated relevancy values may be stored in the database 220 if desired.

The topic modeling module 264 then transmits the identified topics and their relevancy values to other modules in the computer server 204 via the notification interface 516. For example, and referring back to FIG. 2, the topic modeling module 264 may transmit the identified topics and/or their relevancy values to the UI modification module 268 and/or the notification module 276, as explained above.

Figure 6:
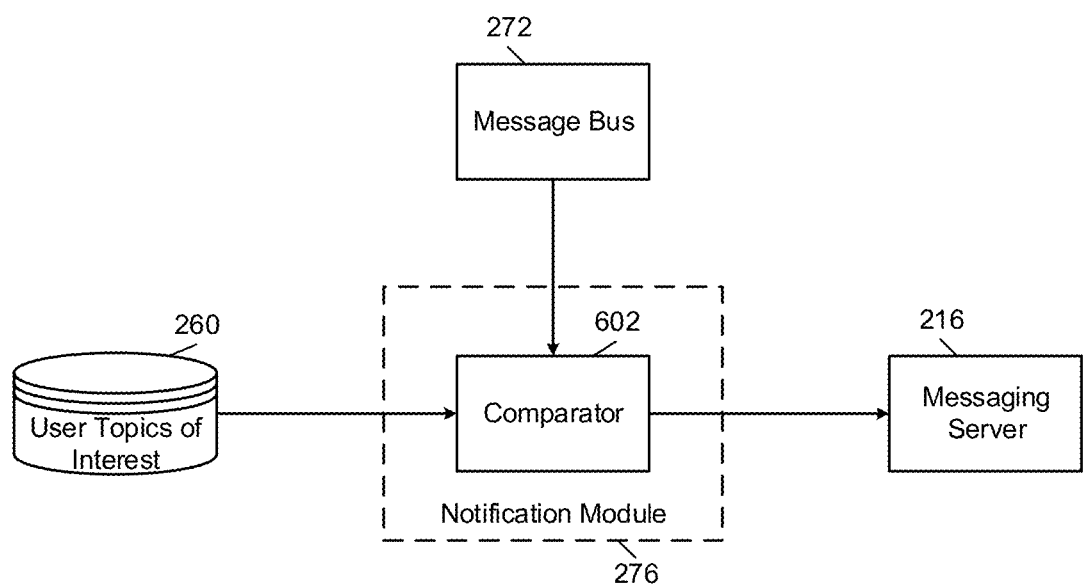
FIG. 6 is a functional block diagram of an example implementation of a notification module in the system of FIG. 2.

FIG. 6 depicts one example of the notification module 276 of FIG. 2 for determining if any of the identified topics is particularly relevant to users using and/or having access to the virtual environment. As shown in FIG. 6, the notification module 276 includes a comparator 602 that compares the identified topics provided via the message bus 272 to the defined topics provided by users and stored in the database 260. In response to detecting one or more matches, the comparator 602 transmits a notification of the matching topic(s) to the messaging server 216, as explained above.

Flowcharts

Figure 7:
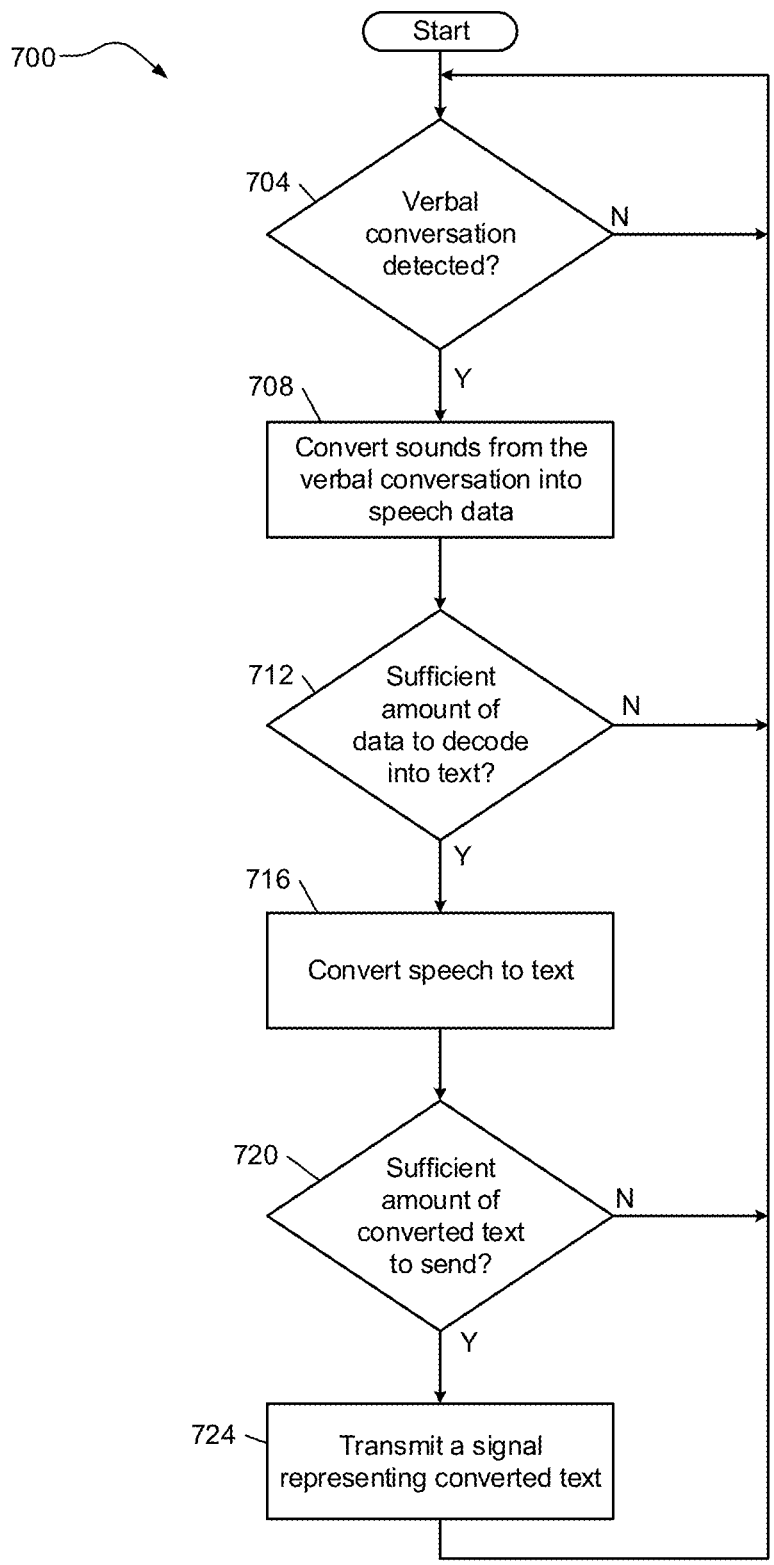
FIG. 7 is a flowchart of an example speech-to-text conversion method according to the principles of the present disclosure.

FIG. 7 illustrates an example speech-to-text converter process 700 employable by the computing device 108 that is communicating with the computer server 204 of FIG. 2. Although the example process 700 is described in relation to the computing device 108 and the computer server 204, the process 700 may be employable by any of the computing devices disclosed herein (e.g., the computing device 112) that is communication with any of the computer servers disclosed herein (e.g., the computer server 104 of FIG. 1). The process 700 may start when the computing device is powered-on, when a particular application (e.g., a user application, a web browser, etc.) is activated, and/or at another suitable time.

As shown in FIG. 7, control begins at 704, where control detects whether a verbal conversation has taken place. For example, and as explained herein, the web browser, the user application, etc. of the computing device 108 may include a voice recognition API to provide always-on voice and video capabilities. In such examples, the voice recognition API may detect verbiage from the conversation. If no verbal conversation is detected, control returns to 704. If a verbal conversation is detected, control continues to 708, where control converts sounds from the verbal conversation into speech data.

After the verbal conversation is converted into speech data at 708, control determines whether there is a sufficient amount of converted speech data to decode into text at 712. If so, control proceeds to 716; otherwise, control returns to 704. At 716, control converts the speech data into text using any known suitable technique.

After the speech data is converted into text at 716, control determines whether there is a sufficient amount of converted text to transmit at 720. If so, control proceeds to 724; otherwise, control returns to 704. At 724, control transmits a signal representing the converted text to, for example, the computer server 204 (e.g., the topic modeling module 264). In some examples, the signal representing the converted text may be transmitted via the speech-to-text converter 248 of the computing device 108.

In other examples, control may not convert the speech data into text. In such examples, control may transmit a signal representing data from a raw audio file (e.g., a .wav file storing audio data using mono or stereo pulse-code modulation) of the detected verbal conversation.

Figure 8:
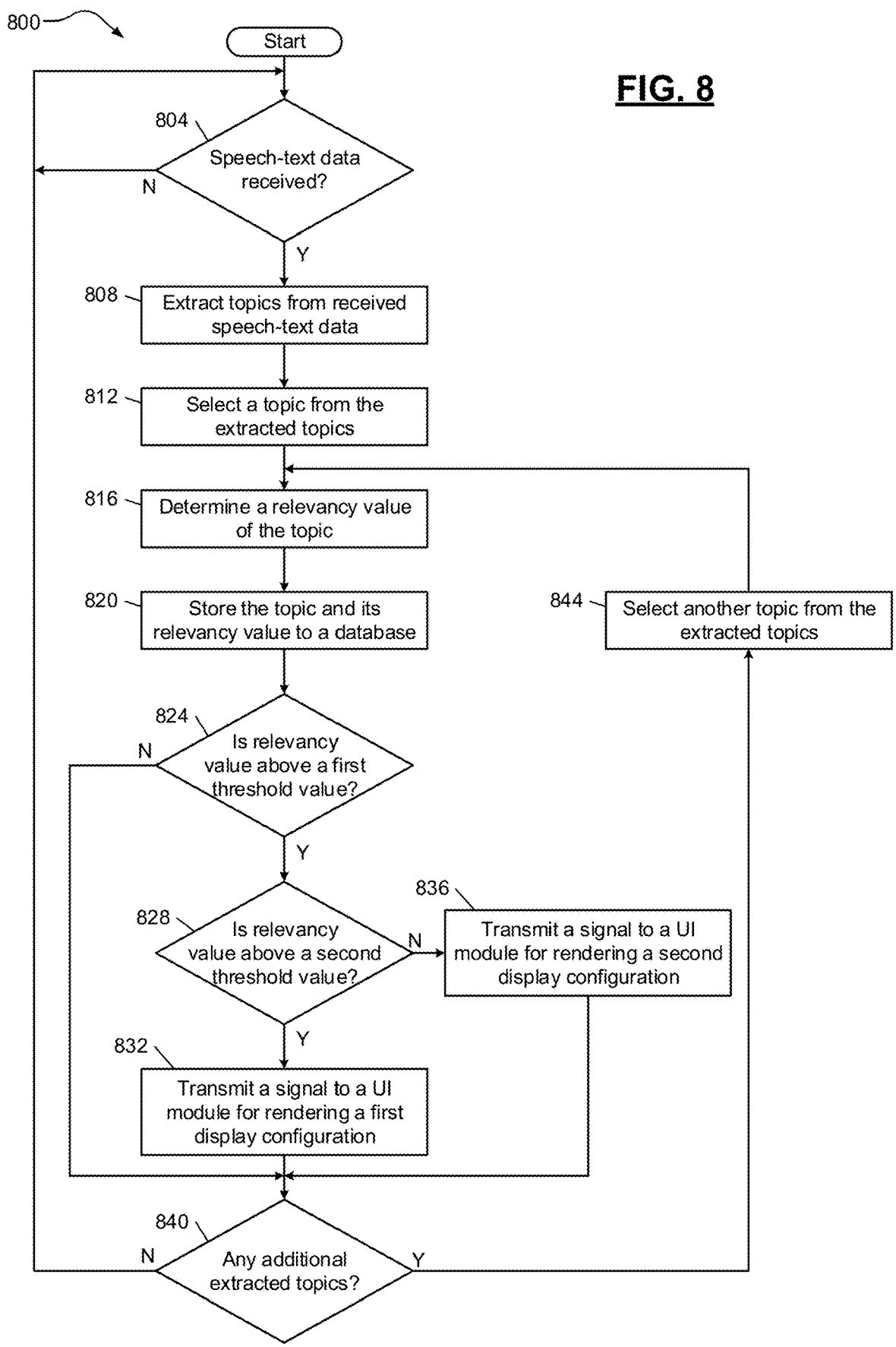
FIG. 8 is a flowchart of an example topic extraction and notification method according to the principles of the present disclosure.

FIG. 8 illustrates an example topic relevancy process 800 employable by the computer server 204 of FIG. 2. Although the example process 800 is described in relation to the computer server 204, the process 800 may be employable by any of the computer severs disclosed herein (e.g., the computer server 104 of FIG. 1). The process 800 may start when the computer server 204 is powered-on, when speech-to-text data is received, and/or at another suitable time.

As shown in FIG. 8, control begins at 804, where control determines whether any speech-to-text data has been received. In some examples, the speech-to-text data may be received by the topic modeling module 264 of the computer server 204. If so, control proceeds to 808; otherwise, control returns to 804. At 808, control identifies and extracts topics from the received speech-to-text data. For example, and as explained above, the topic modeling module 264 may include the topic identifier 504 of FIG. 5 that employs a suitable topic modeling technique such as a natural language processing technique, etc. to identify the topics from the speech-to-text data.

In other examples, control may determine whether any speech-related data has been received at 804, not just speech-to-text data. For example, and as explained herein, control may transmit a signal representing data from a raw audio file (e.g., a .wav file) of the detected verbal conversation. In such examples, control may determine whether a .wav audio file and/or any data from a .wav audio file have been received. If no, control may return; otherwise, control proceeds to identify and extract topics from the audio file via, for example, deep learning techniques.

After extracting the topics at 808, control selects one topic from the extracted tropics at 812 and determines a relevancy value of that topic at 816. In some embodiments, the topic modeling module 264 may include the topic relevancy identifier 508 of FIG. 5 that determines a relevancy value of a topic, as explained above. After this determination, control proceeds to 820, where it stores the topic and its relevancy value in a database such as the database 220 of FIGS. 2 and 5.

Next, control determines whether the relevancy value of the topic is greater than a first threshold value at 824. If so, control continues to 828; otherwise, control proceeds to 840. At 828, control determines whether the relevancy value of the particular topic is greater than a second threshold value. In the particular example of FIG. 8, the second threshold value is greater than the first threshold value. If so, control continues to 832; otherwise, control proceeds to 836.

At 832, control transits a signal to a UI modification module (e.g., the UI modification module 268 of FIG. 2). This transmitted signal may be used to render a first display configuration on one or more computing devices (e.g., the computing device 108) via the web server 212. At 836, control transits a signal to the UI modification module that may be used to render a second display configuration (different than the first display configuration) on the computing device via the web server 212.

After transmitting a signal at 832 or at 836, control proceeds to 840. At 840, control determines whether any additional extracted topics from the received speech-to-text data are present. If so, control continues to 844; otherwise, control returns to 804. Control selects another extracted topic (e.g., the next extracted topic) at 844, and proceeds to 816 to determine a relevancy value of the topic selected in 844. In some examples, the topic modeling module 264 (e.g., the topic identifier 504 of FIG. 5) may select and determine the relevancy of a topic, as explained above.

In some embodiments, the relevancy value may change (e.g., degrade) over time as explained above. As such, control may determine the relevancy value of a particular topic one or more additional times after the initial determination at 816. In some examples, control may determine the changing relevancy value based on a stored formula. This change in the relevancy value may alter the display configuration on the computing devices.

Figure 9:
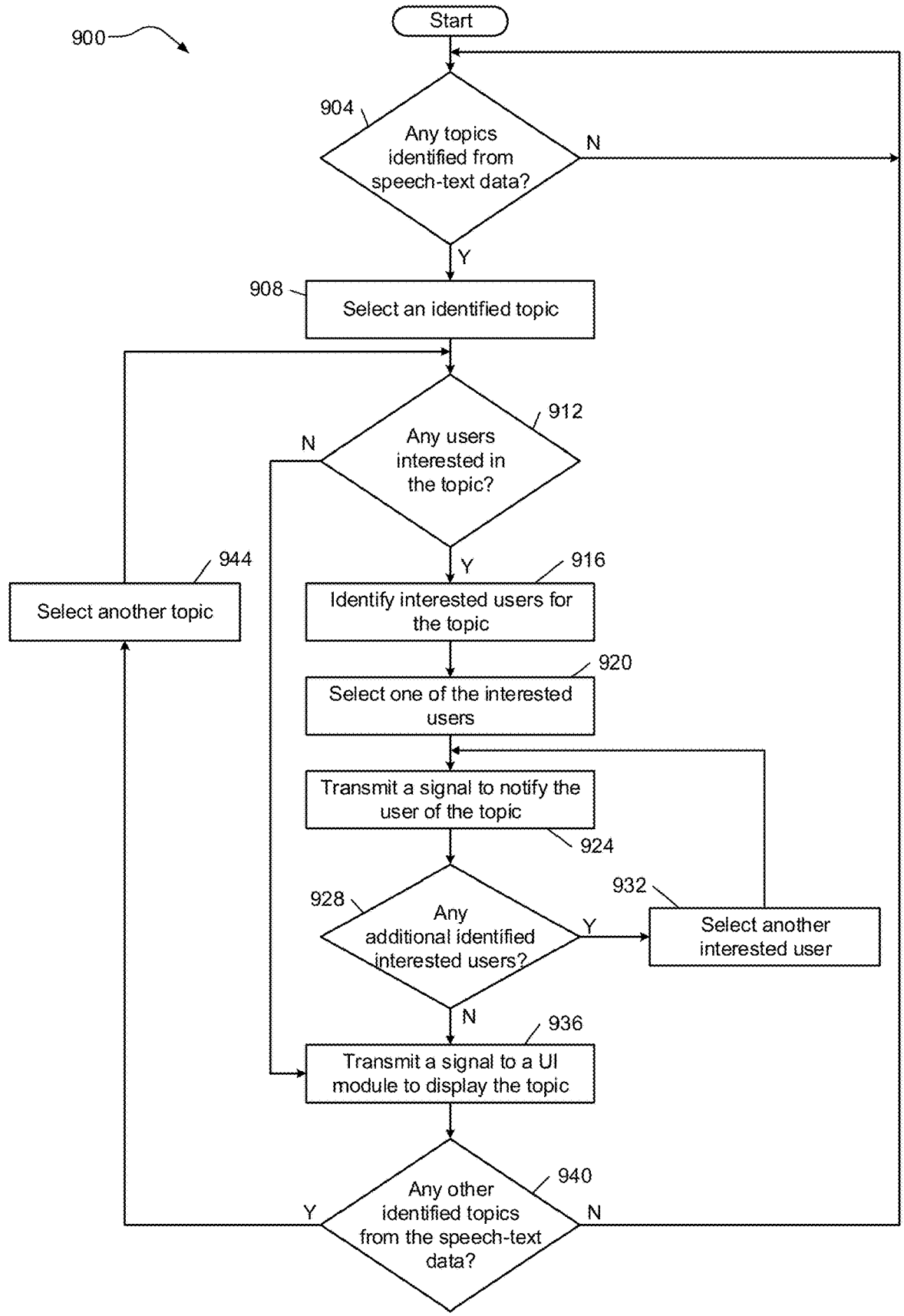
FIG. 9 is a flowchart of an example topic notification method according to the principles of the present disclosure.

FIG. 9 illustrates an example topic notification process 900 employable by the computer server 204 of FIG. 2, and/or any of the computer severs disclosed herein. The process 900 may start when the computer server 204 is powered-on, after speech-to-text data is received, when topics are identified from speech-to-text data, and/or at another suitable time.

As shown in FIG. 9, control begins at 904, where control determines if any topics were identified from speech-to-text data received from, for example, one or more computing devices. In such examples, the speech-to-text data may be generated by the one or more computing devices based on a conversation between users over a video conferencing application, as explained above. If so, control continues to 908; otherwise, control returns to 904. At 908, control selects a topic from the identified topics. In some examples, the notification module 276 of FIG. 2 may be employed to select one of the identified topics, which are received from the topic modeling module 264 via the message bus 272.

Next, control determines whether any users are interested in the selected topic at 912. If so, control continues to 916; otherwise, control proceeds to 936. For example, the notification module 276 of FIG. 2 may determine whether any users are interested in the selected topic by comparing the selected topic to defined topics of interest provided by different users and stored in the database 260. If the selected topic matches any of the defined topics of interest, then at least one user is interested in the selected topic.

At 916, control identifies the one or more interested users for the selected topic. This identification may be based on, for example, information provided by users and stored in the database 260. Next, control selects one of the interested users at 920, and transmits a signal to notify that user of the topic at 924. For example, once the user is identified, the notification module 276 may transmit a signal representing a notification of the matching topic to the messaging server 216 of FIG. 2. The messaging server 216 may then pass this notification on to the user via a messaging client on his/her computing device.

Next, control determines whether any additional identified users exist at 928. If so, control continues to 932, otherwise, control proceeds to 936. Control selects another interested user (e.g., the next interested user) of the topic at 932, and continues to 924, where control transmits a signal to notify the other user of the topic.

At 936, control transmits a signal to a UI modification module (e.g., the UI modification module 268 of FIG. 2). This transmitted signal may be used to render one or more display configurations on one or more computing devices (e.g., the computing device 108) via the web server 212, as explained above.

Next, control determines whether any other topics were identified from the speech-text data received from, for example, the one or more computing devices at 940. If so, control continues to 944; otherwise, control returns to 904. At 944, control selects another topic (e.g., the next topic) from the identified topics. After another topic is selected, control returns to 912.

Message Sequence Chart

Figure 10:
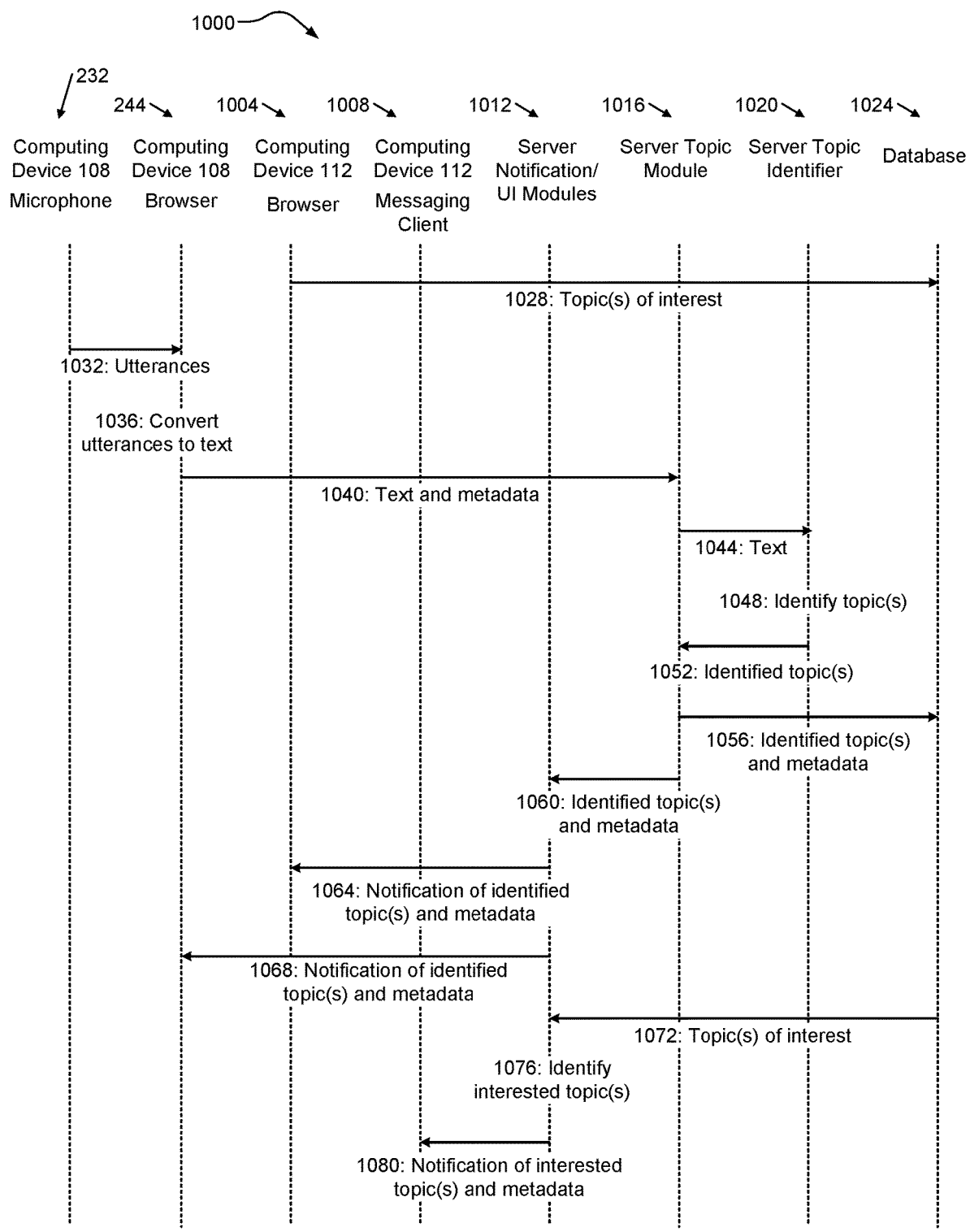
FIG. 10 is a message sequence chart of a topic extraction and notification operation according to the principles of the present disclosure.

In FIG. 10, a message sequence chart 1000 of topic extraction and notification across multiple computing devices is shown. The components of the message sequence chart include the microphone 232 and the client 244 of the computing device 108, a client 1004 (such as a web browser) of the computing device 112, a messaging client 1008 of the computing device 112, a notification/UI module 1012 (e.g., the UI modification module 268 and/or the notification module 276 of FIG. 2), a topic module tracker 1016 (e.g., the topic modeling module 264 of FIG. 2), a topic identifier 1020 (e.g., the topic modeling module 264 of FIG. 2), and a database 1024. The notification/UI module 1012, the topic module tracker 1016, and the topic identifier 1020 may be server-side components. Additionally, the database 1024 may encompass one or more databases.

Using the client 1004, a user of the computing device 112 may select, identify, etc. one or more topics of interest. The topic(s) of interest are transmitted to the database 1024 for storage at 1028.

Using the microphone 232, the user of the computing device 108 may have a conversation with others over a video conferencing application. Utterances from the conversation are passed to the client 244 at 1032. A browser plugin (such as a browser's Web Speech API) may leverage speech-to-text libraries to convert the raw audio (e.g., the utterances) to a text transcript at 1036. After this conversation, the text and metadata corresponding to the conversation are transmitted to the server-side topic module tracker 1016 at 1040. The metadata may include, for example, information about the users participating in the conversation such as names and a location within the virtual environment, and information about the conversation such as a timestamp.

At 1044, the text of the conversation is transmitted to the topic identifier 1020. The topic identifier 1020 analyzes the text, and identifies one or more topics from the text at 1048. The identified topic(s) are then passed to the topic module tracker 1016 at 1052. The identified topic(s) and the metadata are transmitted to the database 1024 for storage at 1056, and the notification/UI module 1012 at 1060.

Using the notification/UI module 1012, notifications are provided to the clients 244, 1004 of the computing device 108, 112 at 1064, 1068. The notifications may provide, to users participating in the virtual environment, information about the identified topic(s) and metadata. For example, the notification/UI module 1012 may transmit, to the clients 244, 1004, the identified topic(s) and associated metadata for display in the virtual environment. In some examples, the identified topic(s) and metadata may be transmitted via a web server as explained herein.

At 1072, the notification/UI module 1012 receives, from the database 1024, the stored topic(s) of interest associated with the user of the computing device 112. Using the notification/UI module 1012, the identified topic(s) are compared to the topic(s) of interest to identify any matches between the sets of topics at 1076. These matches are considered interested topic(s) for the user of the computing device 112. At 1080, the interested topic(s) and associated metadata are transmitted to the messaging client 1008 of the computing device 112 to notify the user.

Visual Examples

The virtual environments disclosed herein may be any suitable visualization of a grouping of avatars. For example, the virtual environments may include a floor plan of a virtual office space, a classroom in a virtual school, etc. In some examples, the virtual environments may include multiple floor plans representing different floors of a building, different teams of a company, different offices in various cities, etc. When a virtual environment includes multiple floor plans, each of the floor plans may include a particular room that is visible, shared, etc. in all floor plans. This may allow, encourage, etc. collaboration between different teams (having their own virtual floor plan) in the visible, shared, etc. room. When the floor plans represent different teams, each team may have the ability to personalize their space (e.g., the areas, rooms, etc. in their floorplan). This may allow teams to show off their personality, team awards, etc. In some examples, personalization transactions may be made with one or more cryptocurrencies such as AmeriCoin.

In some examples, the floor plans may be an actual layout of an office based on GPS modeling applications. In other examples, the floor plans may be fictitious.

Figure 11:
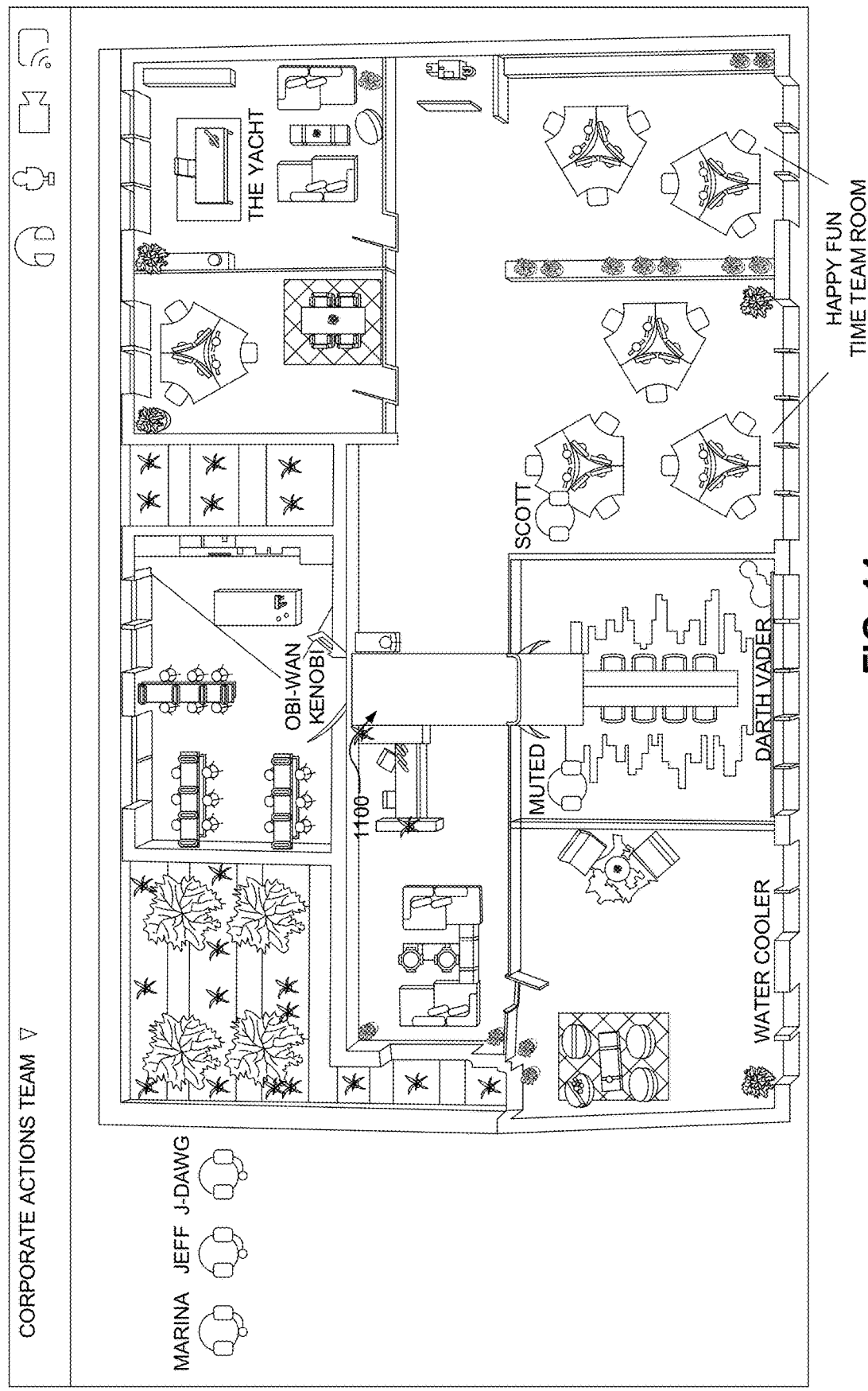
FIG. 11 is a screenshot of an example floor plan of a virtual office space according to the principles of the present disclosure.

In FIG. 11, a screenshot 1100 of one example floor plan of a virtual office space is depicted. As shown, the floor plan includes various rooms such as a "Water Cooler" room, a "Darth Vader" room, a "Happy Fun Time Team" room, a "Yacht" room, and an "Obi-Wan Kenobi" room. As shown, an avatar representing a user named Scott is located in the "Happy Fun Time Team" room, an avatar representing a muted user is located in the "Darth Vader" room, and avatars representing other users (e.g., Marina, Jeff, J-Dawg, etc.) are located on the outskirts of the floorplan.

In the example of FIG. 11, the "Water Cooler" room may be visible, shared, etc. among other floor plans (e.g., other teams) if desired. Additionally, the "Happy Fun Time Team"

room may be dedicated to specific activities based on voice commands. For example, if Scott says (via his video conferencing application) a specific word, phrase, etc. while in the "Happy Fun Time Team" room, a game of Solitaire may appear, audio may be streamed for any of the users in the room, etc.

Figure 12:
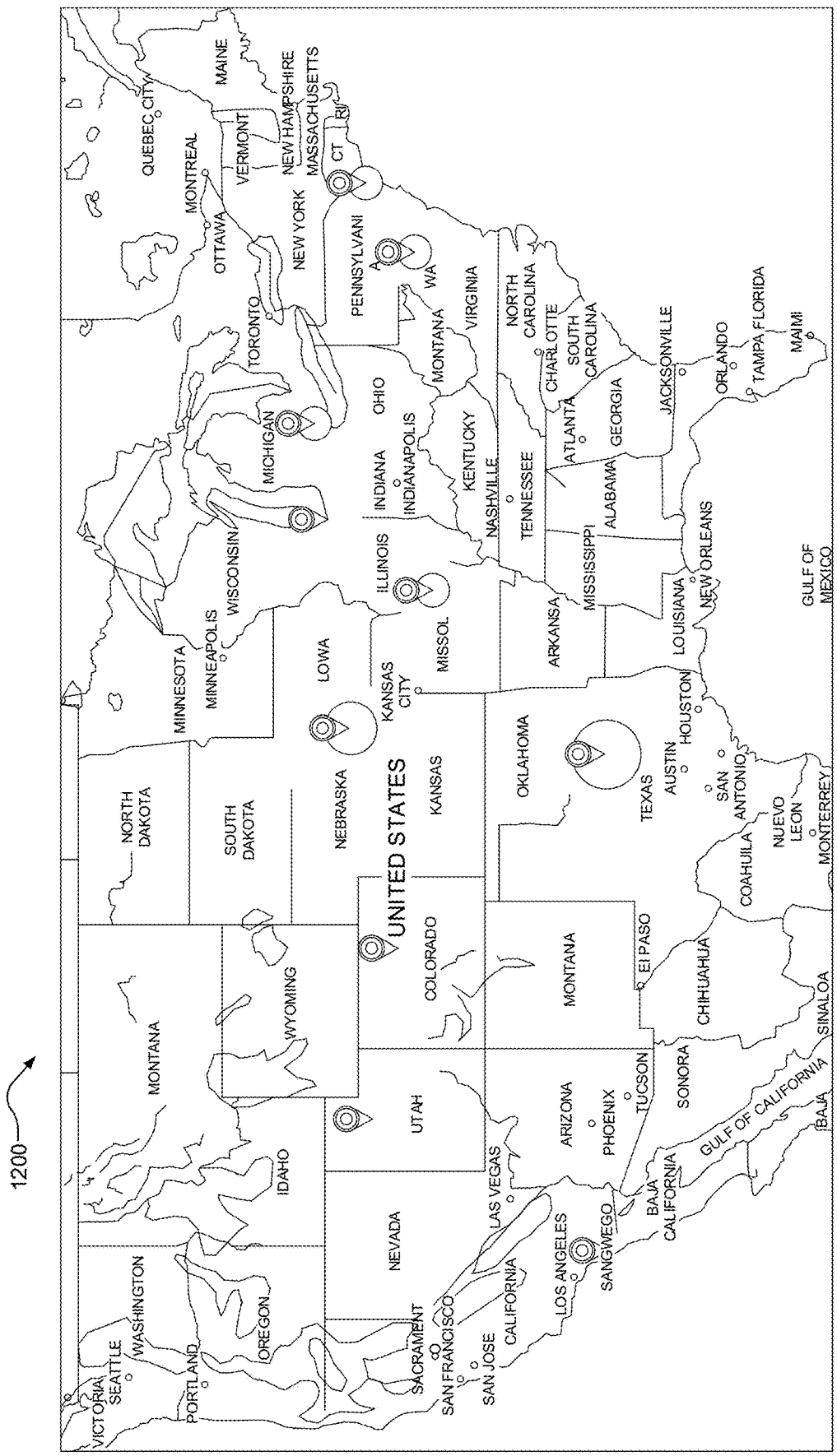
FIG. 12 is a screenshot of an example map of a virtual environment according to the principles of the present disclosure.

In some examples, the virtual environments may provide a companywide/organizational view. This may allow visibility of floorplan activities through various lenses, such as by a geographic region, an organizational breakdown, product groups, etc. For example, FIG. 12 illustrates a screenshot 1200 of an example virtual map indicating pinpoint locations of different offices in a company. As shown, the map includes visual indictors surrounding the pinpoint locations. The visual indictors may include a circle, a color, etc. that changes as the level of activity in a floorplan changes. For example, a large circle surrounds the pinpoint location representing an office in Dallas whereas a relatively small circle surrounds the pinpoint location representing an office in St. Louis. This may indicate a larger level of activity (e.g., user participation) in the floorplan representing the Dallas office versus the floorplan representing the St. Louis office. In some examples, a user may click on a particular pinpoint location to access a virtual floorplan (e.g., a virtual environment) representing a particular office.

Figure 13:
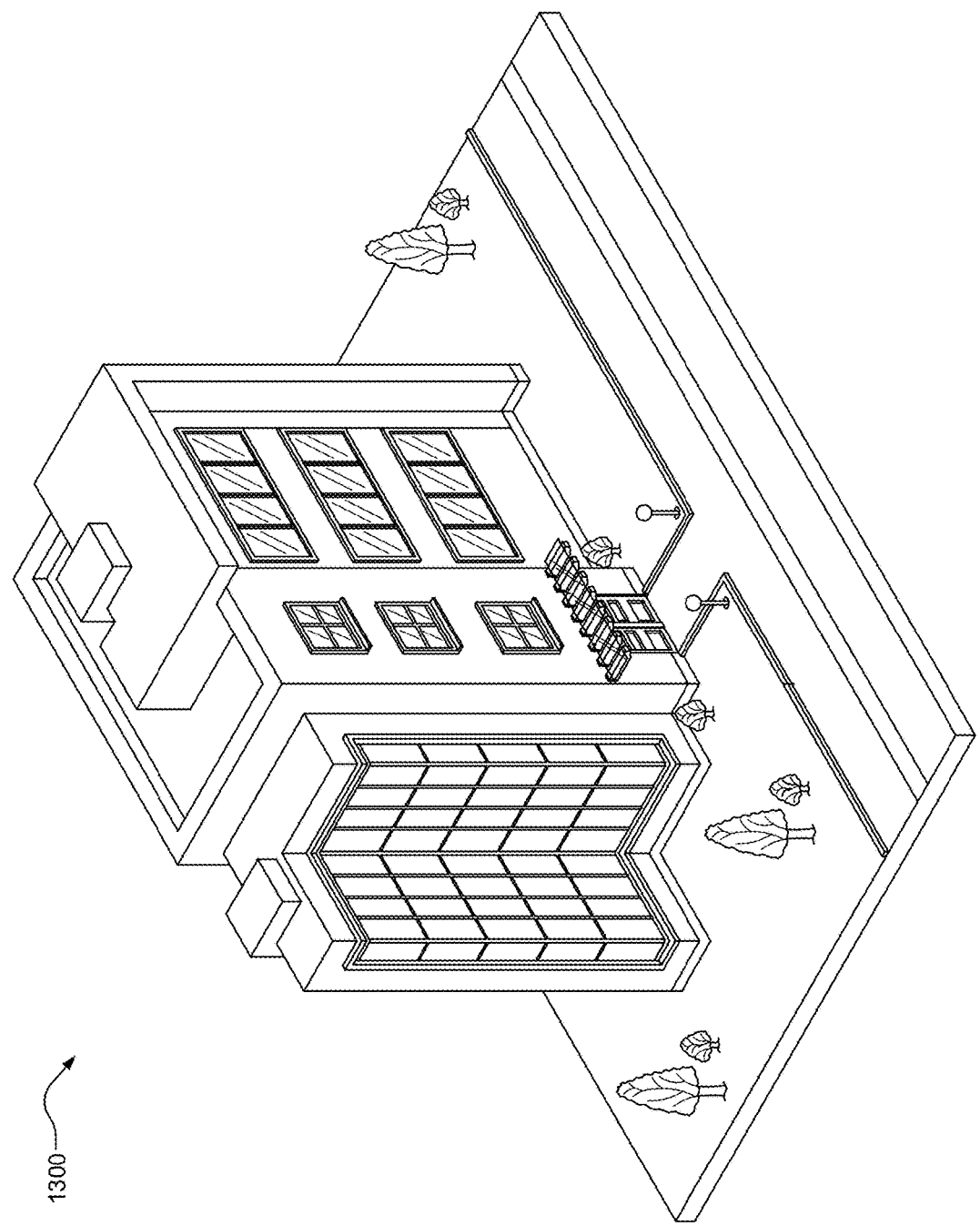
FIG. 13 is a screenshot of an example street detail of a virtual environment according to the principles of the present disclosure.

In FIG. 13, a screenshot 1300 of an example virtual street detail representing a companywide/organizational view is depicted. As shown, the virtual street detail includes a building such as an office building having multiple floors. While in a virtual environment, users may click on the building to access virtual floorplans representing an office, one of the floors to access a particular virtual floorplan representing a team in the office, etc.

Figure 14:
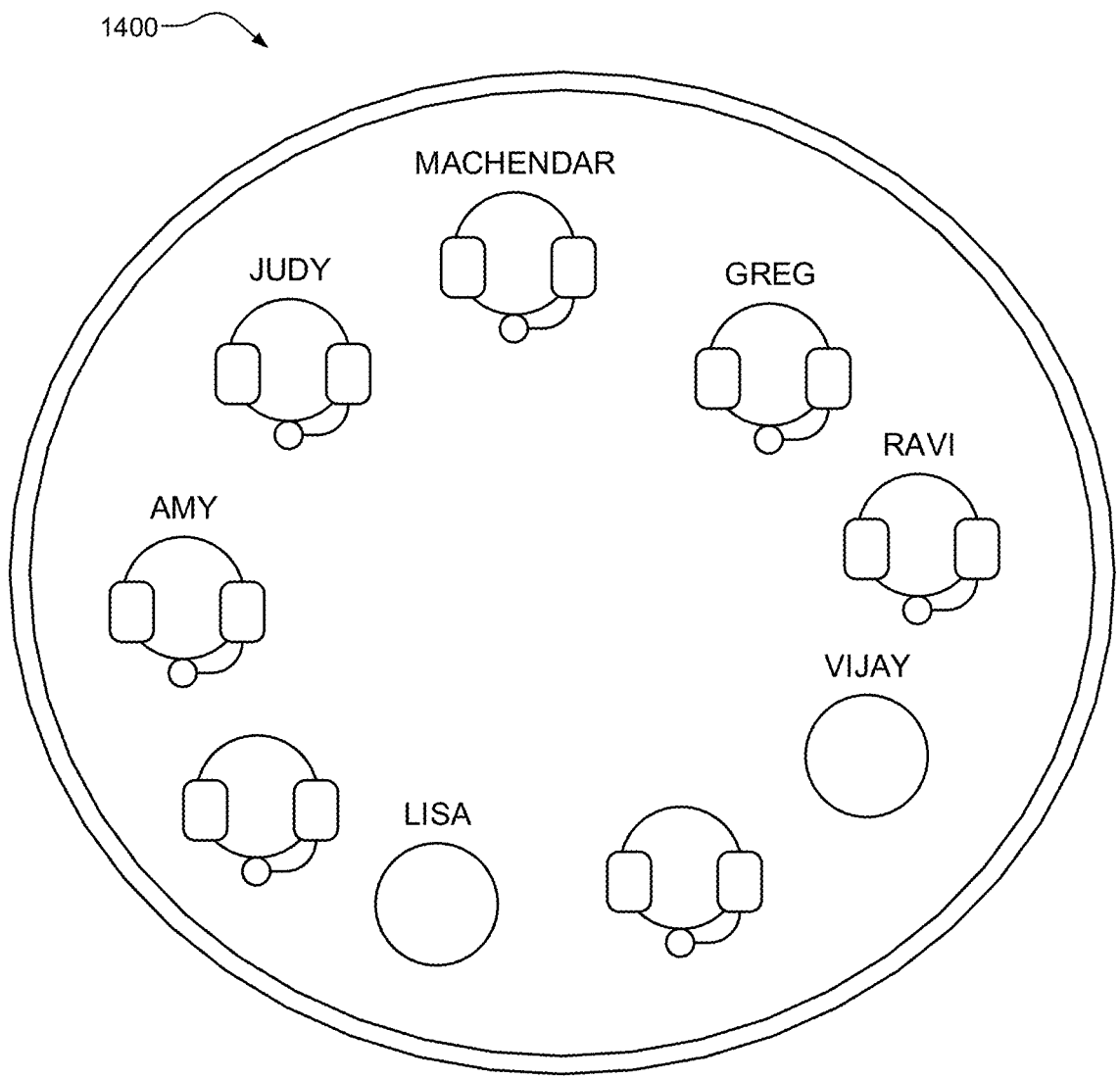
FIG. 14 is a screenshot of an example virtual environment including avatars grouped a huddle according to the principles of the present disclosure.

In other examples, the virtual environments may include avatars grouped together in particular areas, one or more circles, etc. For example, FIG. 14 illustrates a screenshot 1400 of a virtual environment including avatars grouped together in a circle representing a huddle room. In the example of FIG. 14, the avatars may represent users of a trader team in a morning huddle. The users include Amy, Judy, Machendar, Greg, Ravi, Vijay, and Lisa. In this example, Amy, Judy, Machendar, Greg, and Ravi are interacting with others in the huddle through a verbal conversation. Lisa and Vijay may be interacting with others using an instant messaging feature, or merely listening to the discussion (e.g., without interacting). In some examples, the huddle room may be active only during a scheduled meeting time (e.g., from 9:00 to 9:15 EST).

Figure 15:
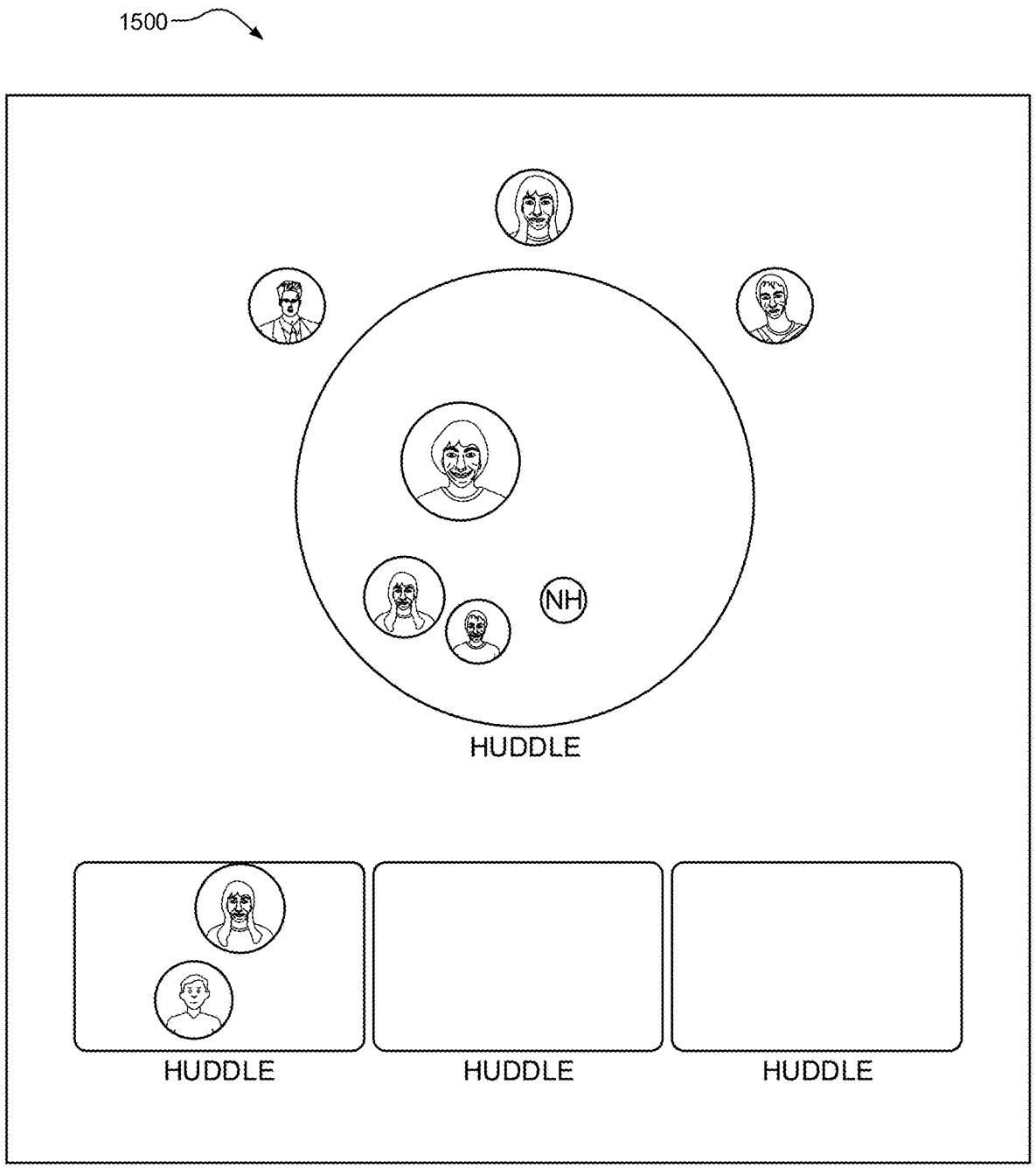
FIG. 15 is a screenshot of an example virtual environment including four huddles according to the principles of the present disclosure.

FIG. 15 illustrates a screenshot 1500 of another example virtual environment including avatars grouped together in particular areas (e.g., huddle rooms). In the example of FIG. 15, the virtual environment includes four huddle rooms, and avatars representing users participating in the virtual environment. In the example of FIG. 15, the avatars are depicted by photographs of users or a user's initials. The huddle rooms of FIG. 15 are depicted by a circle and three rectangles. As shown, four users are participating in one huddle as signified by the four avatars located within the circular huddle room. Three users represented by the avatars located outside the circle may be non-participating visitors who are merely listening to the discussion. Additionally, two other users are participating in another huddle as signified by the two avatars located within one of the rectangular huddle rooms.

In some examples, the rooms, huddles, areas, etc. in the virtual environments disclosed herein may be geared to one or more Agile Ceremonies (sometimes referred to as Agile Events). The Agile Ceremonies may include, for example, Daily Standup (e.g., Daily Scrum), Sprint Planning, Sprint Retrospective, etc. Additionally, links to other resources may be provided on the rendered virtual environment. For example, links to online collaboration applications (e.g., Mural®, Miro®, etc.) and project tracking applications (e.g., Jira®, etc.) may be provided a rendered floorplan.

Additionally, objects in any one of the virtual environments disclosed herein may change in response to events. For example, if a particular topic is identified, one or more virtual objects (e.g., a lava lamp, an aviator, etc.) may change visually. For instance, if the phrase "Parrot Party" is identified, some or all of the avatars in a room where the phrase was uttered may flash different colors. Additionally, if the word "Congratulations" is identified, virtual fireworks may go off in one or more rooms. In some examples, real world events may cause a visual change in the virtual objects. For example, a virtual lava lamp may be positioned in a particular room of the virtual environment. The virtual lava lamp may change states (e.g., change color, flash, etc.) based on real world events. For instance, the virtual lava lamp may be green if a milestone on a project is reached, yellow if the milestone is not reached by a deadline, red if issues arise with the milestone, etc.

Further, requests may be sent to users inviting them to join a conversation in the virtual environment. The requests may be sent via a messaging client as explained above. In some examples, voice commands may be employed. For example, a user may say "go get Nathan" while using the video conferencing application. In response, the computer server may send a notification (e.g., a link, etc.) to Nathan's computing device (e.g., via a messaging client, the video conferencing application, a talk bubble, etc.) inviting him to join a particular room.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WWI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system for facilitating real-time user interactions in a virtual environment of a user application accessible by a plurality of computing devices, the system comprising:
   processor hardware; and memory hardware configured to store instructions, the processor hardware configured to execute the instructions and cause the system to perform,
receiving a set of defined topics including a defined topic from a first computing device of the plurality of computing devices;
receiving, from at least one of the plurality of computing devices, data representing machine-readable text converted from a verbal conversation between two or more users in the virtual environment of the user application;
identifying a set of topics from the data representing machine-readable text:
comparing the identified set of topics from the data representing machine-readable text to the set of defined topics;
in response to detecting a match between a topic of the identified set of topics and the defined topic of the set of defined topics, determining a relevancy value of the topic of the identified set of topics, wherein the relevancy value is a weighted average indicating a degree of importance for the topic as compared to other topics of the identified set of topics based on at least one or more data feeds providing information from one or more internet sources; and
transmitting, to the first computing device, a notification of the matching defined topic only if the relevancy value of the topic is greater than a threshold value.

2. The system of claim 1, further comprising a database, wherein the processor hardware is configured to execute the instructions and cause the system to perform storing the Identified set of topics in the database.

3. The system of claim 1, further comprising a database, wherein the processor hardware is configured to execute the instructions and cause the system to perform storing the set of defined topics in the database.

4. The system of claim 1, wherein the processor hardware is configured to execute the Instructions and cause the system to perform transmitting the virtual environment of the user application for display on the plurality of computing devices.

5. The system of claim 4, wherein the processor hardware is configured to execute the instructions and cause the system to perform transmitting the identified set of topics for display in the virtual envelopment of the user application.

6. The system of claim 4, wherein the virtual environment includes a floor plan of a virtual office space.

7. The system of claim 1, wherein transmitting the notification of the matching defined topic includes transmitting the notification of the matching defined topic via a messaging application accessible by the first computing device.

8. The system of claim 1, wherein:
the topic of the identified set of topics is a first topic;
the identified set of topics includes a second topic; and
the processor hardware is configured to execute the instructions and cause the system to perform determining a relevancy value of the second topic.

9. The system of claim 8, wherein the relevancy value of the second topic is determined based on at least one of user input and the one or more data feeds.

10. The system of claim 8, wherein the processor hardware is configured to execute the instructions and cause the system to perform transmitting the first topic or display in the virtual environment as a Brat visual configuration based on the relevancy value of the first topic, and transmitting the second topic for display in the virtual environment as a second visual configuration based on the relevancy value of the second topic.

11. The system of claim 10, wherein:
the processor hardware is configured to execute the instructions and cause the system to perform determining whether the relevancy value of the first topic has degraded after a defined time period has elapsed, and in response to determining the relevancy value of the first topic has degraded, transmitting the first topic for display in the virtual environment as a third visual configuration; and
the third visual configuration is different than the first visual configuration.

12. The system of claim 10, wherein transmitting the first topic for display in the virtual environment includes transmitting the first topic for display in the virtual environment only if the relevancy value of the first topic Is greater than the threshold value.

13. The system of claim 10, wherein the first visual configuration Is different than the second visual configuration when the relevancy value of the first topic is different than the relevancy value of the second topic.

14. A method of facilitating real-time user interactions in a virtual environment of a user application accessible by a plurality of computing devices, the method comprising:
receiving a set of donned topics including a defined topic from a first computing device of the plurality of computing devices;
receiving, from at least one of the plurality of computing devices, data representing machine-readable text converted from a verbal conversation between two or more users in the virtual environment of the user application;
identifying a set of topics from the data;
comparing the identified set of topics from the data representing machine-readable text to the set of defined topics;
in response to detecting a match between a topic of the Identified set of topics and the denned topic of the set of denied topics, determining a relevancy value of the topic of the identified set of topics, wherein the relevancy value is a weighted average indicating a degree of importance for the topic as compared to other topics of the identified set of topics based an at least one or more data feeds providing information from one or more Internet sources; and
transmitting, to the first computing device, a notification of the matching defined topic only if the relevancy value of the topic is greater than a threshold value.

15. The method of claim 14, further comprising:
storing the identified set of topics in a database; and
storing the set of defined topics in the database.

16. The method of claim 14, further comprising:
transmitting the virtual environment of the user application for display on the plurality of computing devices; and
transmitting the identified set of topics Ar display in the virtual environment of the user application.

17. The method of claim 16, wherein the virtual environment includes a floor plan of a virtual office space.

18. The method of claim 14, wherein the transmitting the notification of the matching defined topic includes transmitting the notification of the matching defined topic via a messaging application accessible by the first computing device.

19. The method of claim 14, wherein:
the topic of the identified set of topics is a first topic;
the identified set of topics includes a second topic; and
the method further comprises determining a relevancy value of the second topic based on at least one of user input and the one or more data feeds, transmitting the first topic for display in the virtual environment as a first visual configuration based on the relevancy value of the lint topic, and transmitting the second topic for display in the virtual environment as a second visual configuration based on the relevancy value of the second topic.

20. The method of claim 19, wherein:

the method further comprises determining whether the relevancy value of the first topic has degraded after a defined time period has elapsed, and in response to determining the relevancy value of the first topic has degraded, transmitting the first topic for display in the virtual environment as a third visual configuration:

the third visual configuration is different than the first visual configuration;

transmitting the first topic for display in the virtual environment includes transmitting the lint topic for display in the virtual environment only if the relevancy value of the first topic is greater than the threshold value; and the first visual configuration is different than the second visual configuration when the relevancy value of the lint topic is different than the relevancy value of the second topic.

* * * * *